(12) United States Patent
Gentile et al.

(10) Patent No.: US 12,081,900 B2
(45) Date of Patent: Sep. 3, 2024

(54) REMOTE TELEPROMPTER AND PRODUCTION SYSTEM

(71) Applicant: Hidden Content LLC, New York, NY (US)

(72) Inventors: Anthony Gentile, New York, NY (US); Adam Donald, Brooklyn, NY (US); Jacob Wasserman, New York, NY (US); Jay Shapiro, Raleigh, NC (US)

(73) Assignee: Hidden Content LLC, New York, NY (US)

( * ) Notice: Subject to any disclaimer, the term of this patent is extended or adjusted under 35 U.S.C. 154(b) by 107 days.

(21) Appl. No.: 17/977,571

(22) Filed: Oct. 31, 2022

(65) Prior Publication Data
US 2023/0138792 A1 May 4, 2023

Related U.S. Application Data

(60) Provisional application No. 63/273,657, filed on Oct. 29, 2021.

(51) Int. Cl.
*H04N 5/28* (2006.01)
*H04N 23/51* (2023.01)
*H04N 23/54* (2023.01)
*H04N 23/66* (2023.01)

(52) U.S. Cl.
CPC .............. *H04N 5/28* (2013.01); *H04N 23/51* (2023.01); *H04N 23/54* (2023.01); *H04N 23/66* (2023.01)

(58) Field of Classification Search
CPC .......... H04N 5/28; H04N 23/51; H04N 23/54; H04N 23/66; G03B 3/12; G03B 17/561; G03B 29/00
See application file for complete search history.

(56) References Cited

U.S. PATENT DOCUMENTS

| | | | |
|---|---|---|---|
| 5,550,754 | A | 8/1996 | McNelley et al. |
| 6,104,424 | A | 8/2000 | McNelley |
| 7,057,637 | B2 | 6/2006 | White |
| 7,209,160 | B2 | 4/2007 | McNelley et al. |

(Continued)

OTHER PUBLICATIONS

Hidden Content, "Remote Solutions" [online] [retrieved Jan. 20, 2023]. Retrieved from the Internet: <https://www.hiddencontent.com/remote-solutions>.
Motivo, "Remote Production Kit" [online] [retrieved Jan. 20, 2023]. Retrieved from the Internet:; <https://motivo.me/remote-production-kit>.

(Continued)

*Primary Examiner* — Padma Haliyur
(74) *Attorney, Agent, or Firm* — Lerner David LLP

(57) ABSTRACT

A portable, collapsible video production system includes a case having a top lid connected to a bottom lid, a lift rigidly secured within the case to the top lid or the bottom lid, and a collapsible camera system rigidly secured to a top of the lift. The camera system includes a bottom frame member housing a computer with a screen, a middle frame member housing a transparent substrate that, when angled with respect to the bottom frame member, is configured to project an image of the screen to a user facing the case, and a top frame member housing a camera that, when angled with respect to the bottom frame member, is configured to aim the camera through the transparent substrate at a user facing the case. The bottom frame, the middle frame, and the upper frame are pivotably connected to each other along a hinge axis.

11 Claims, 20 Drawing Sheets

(56) References Cited

U.S. PATENT DOCUMENTS

| | | | |
|---|---|---|---|
| 8,599,239 B2 | 12/2013 | White | |
| 9,013,629 B2 | 4/2015 | Vito | |
| 9,030,603 B1 | 5/2015 | Vito | |
| 10,491,785 B1 | 11/2019 | Arnot | |
| 10,827,827 B1* | 11/2020 | Failing | A47B 21/03 |
| 2005/0110865 A1 | 5/2005 | Wintzen et al. | |
| 2010/0182513 A1 | 7/2010 | DeOtte | |
| 2013/0083370 A1* | 4/2013 | Mudd | H04N 1/00535 358/474 |
| 2013/0294021 A1* | 11/2013 | Zhao | G06F 1/1628 361/679.09 |
| 2014/0098210 A1 | 4/2014 | Larter | |
| 2015/0138303 A1 | 5/2015 | White | |
| 2020/0042041 A1* | 2/2020 | Lin | G06F 1/1628 |

OTHER PUBLICATIONS

Hayden5, "DROP KIT™ | The Original DROP KIT™ Video & Photo", [online] [retrieved Jan. 20, 2023]. Retrieved from the Internet: <https://hayden5.com/video-photo-drop-kit/>.

Broadcast Management Group, "Remote Production Kits", [online] [retrieved Jan. 20, 2023]. Retrieved from the Internet: <https://www.broadcastmgmt.com/remi-services/remote-production-kits/>.

Abelcine, "Ready-to-Go Remote Camera Packages Available for Productions of All Sizes", [online] [retrieved Jan. 20, 2023]. Retrieved from the Internet: <https://www.abelcine.com/articles/news/product-news/ready-to-go-remote-camera-packages-available-for-productions-of-all-sizes>.

* cited by examiner

144

150

REMOTE TELEPROMPTER AND PRODUCTION SYSTEM

BACKGROUND OF THE INVENTION

Video recording of individuals for interviews and other media content remains a prominent way of communicating, particularly in a world in which remote work environments become more and more common. However, production quality is less than optimal, especially in remote locations. Commonly used video equipment such as phones and tablets have an inherent flaw in that the camera lens and the screen viewed by the user are not aligned along the user's line of sight. Upgrading equipment and creating a system suitable for high quality video production is costly in both expense and in the minimum required technical expertise of personnel that can set up such a system. Moreover, many existing video systems are large involving many heavy components that must be set up individually, or else must be wheeled around on a large platform or cart. Such systems can improve quality but are mainly confined to specific locations as they are not portable or movable without difficulty and cannot be sent to remote locations without requiring huge shipping containers and associated expenses, along with the personnel required to reassemble the system for use.

A need exists for a video production system that is more user-friendly, particularly for an individual not technically educated in the field of video equipment, and that is portable and remotely operated to minimize the effort of the end user and to enhance the quality of video production.

DETAILED DESCRIPTION

Figure 1:
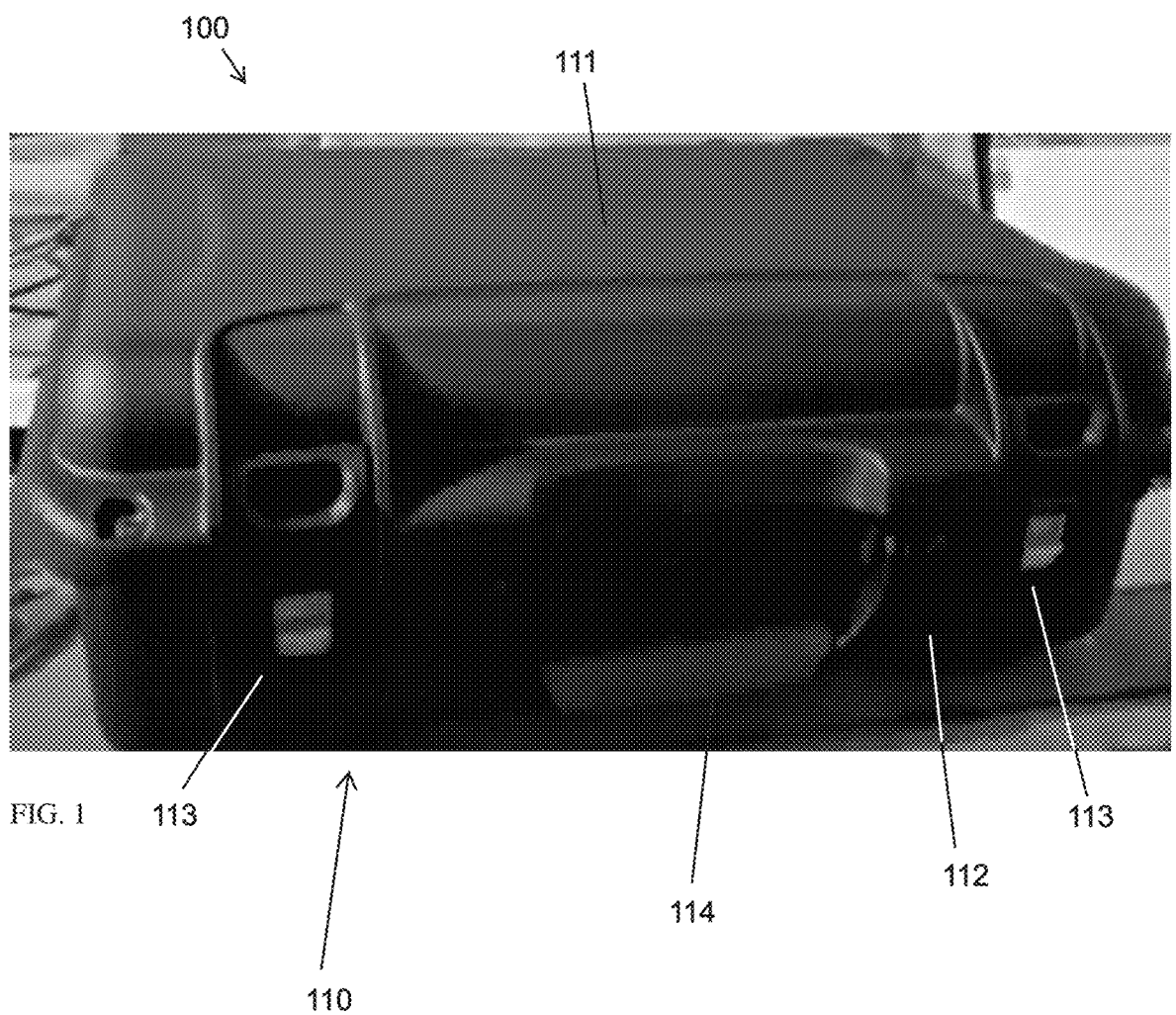
FIG. 1 is a front perspective view of a video production system in a closed configuration in accordance with a first embodiment of the present invention.
Figure 2:
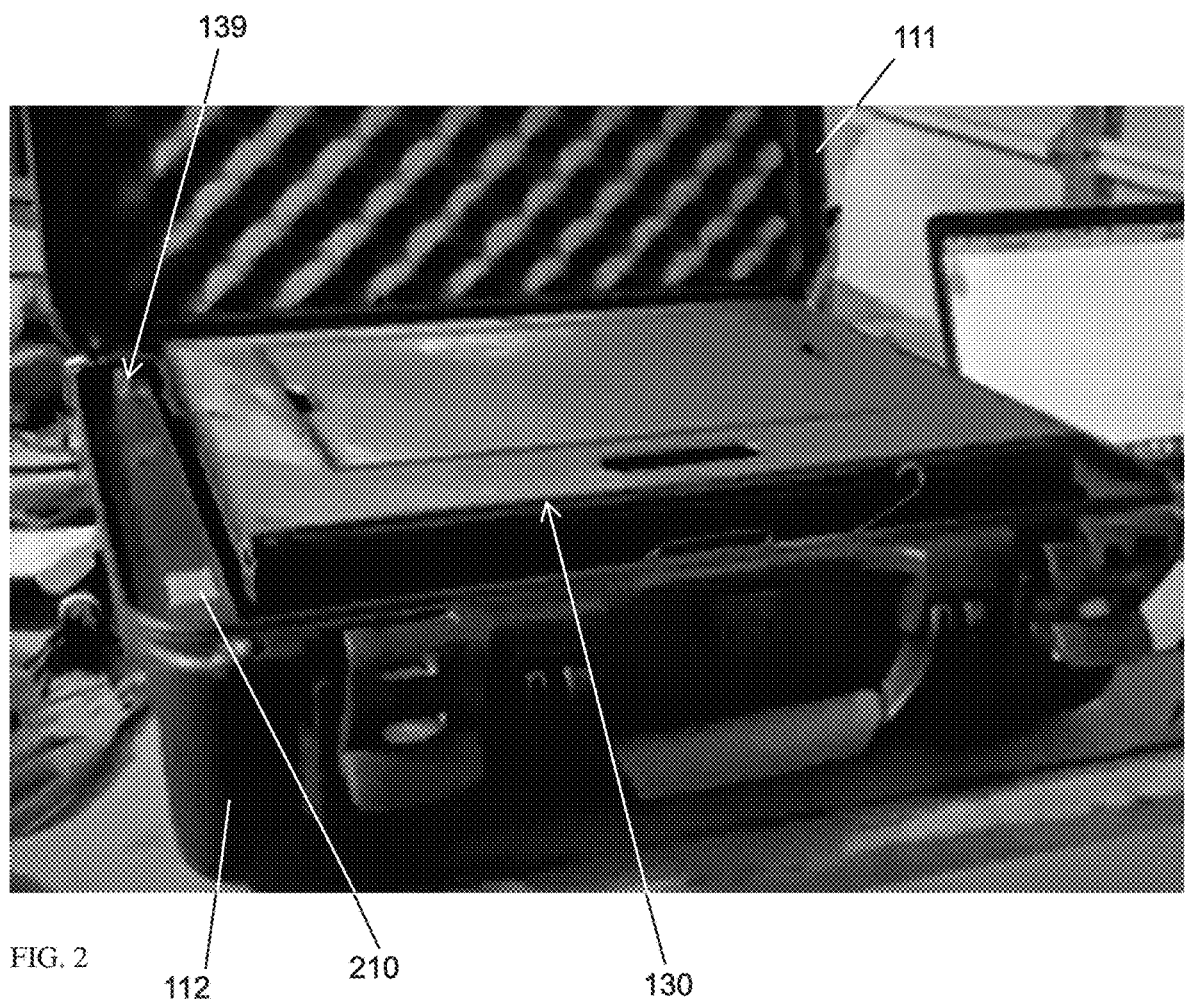
FIG. 2 is a front perspective view of the video production system of FIG. 1 with its case in an open configuration.

As shown in FIGS. 1-19, a video production system 100 is both portable and collapsible. System 100 includes a case 110 having a top lid 111 and a bottom lid 112 pivotably connected on hinges at a rear portion of the case 110, and closable via one or more latches 113 at a front portion of the case 110. One type of case is a Pelican brand case. Case 110 also includes a handle 114 to enable a user to move and ship it easily. Case 110 is sized similarly to a briefcase and is, in one embodiment, made out of hard plastic or metal so that it is durable enough to protect the contents within from movement or damage. One or both of top lid 111 and bottom lid 112 can include a cavity, or one of the lids can be planar. In other embodiments, top lid 111 can be fully removable from bottom lid 112 when case 110 is open.

Figure 3:
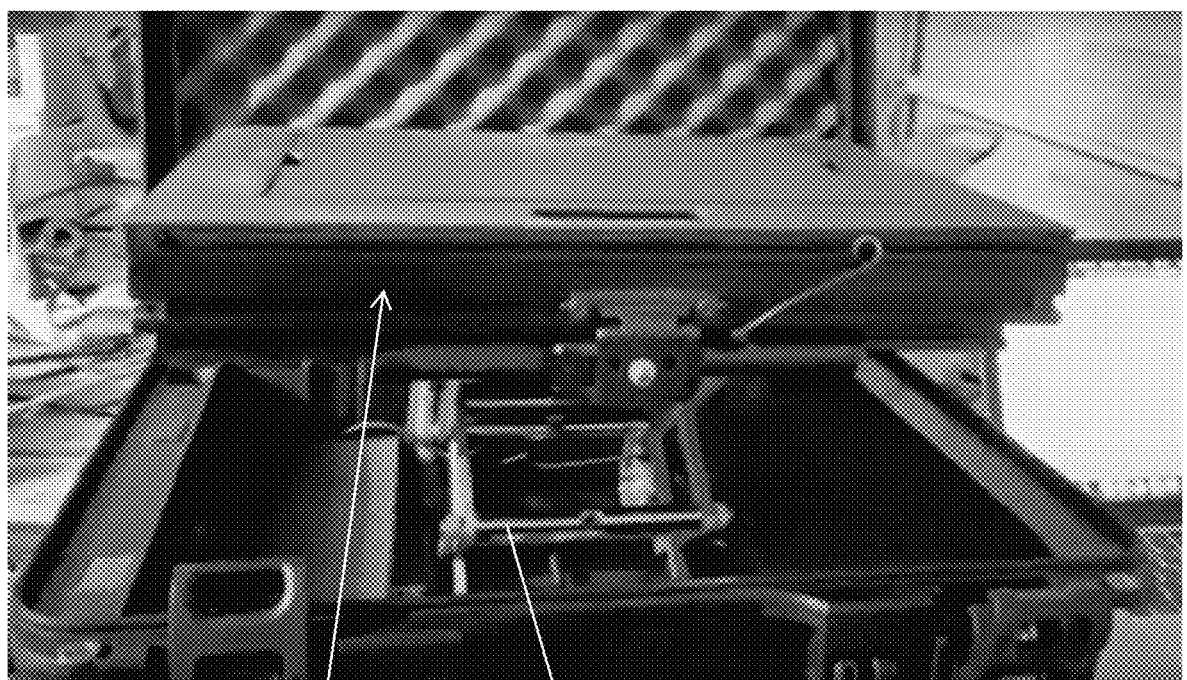
FIGS. 3 and 4 are front perspective views of the video production system of FIG. 1 with a collapsible camera system in a collapsed configuration and raised.

Inside case 110, a lift 120 is rigidly secured to one of top lid 111 and bottom lid 112. As shown in FIG. 3, lift 120 is secured to case bottom lid 112, so that lift 120 is exposed and can be extended upward from bottom lid 112 when case 110 is open. As shown in FIG. 3, lift 120 is designed as a scissor lift, but can be any type of device permitting extension of an item from its anchor point at bottom lid 112, such as a pneumatic lift, etc.

A collapsible camera system 130 is shown in FIGS. 2-7 to be rigidly secured to a top of lift 120 so that it can be moved upward from bottom lid 112 when case 110 is open. Camera system 130 includes a clamshell-type frame having a bottom frame member 131, a top frame member 132, and a middle frame member 133 all pivotable with respect to one another along a hinge axis 134 of the frame. Bottom frame member 131 is rigidly secured to the top of lift 120 and houses a computer 135 having a screen. Computer 135 can be an iPad, a tablet, 2-in-1 laptop, or any other similar computing device in which a screen projects its image upward from bottom frame member when computer 135 is positioned therein. Internal guides or rails can be disposed within bottom frame member 131 to secure computer 135 in place. The guides or rails may be movable or adjustable, such as by using clamps, to enable the use of different types of computers. The screen of computer 135 can be used to display a video feed, typically of another individual or individuals with which the user is communicating, text for the user to read, or for any other projected image or video to be seen by the viewer during use of the camera system 130.

Middle frame member 133 encloses a transparent glass or plastic substrate 136 and is pivotally attached to bottom frame member 131 so that it can be angled at about 45 degrees about the rear hinged connection with respect to bottom frame member 131. In this way, when middle frame member 133 is in its angled position, the screen of computer 135 can be projected to a user sitting in front of system 100 via its reflection on transparent substrate 136.

As seen in FIGS. 7-11, 14, and 15, top frame member 132 includes an enclosure 138 that houses a camera 137, which can be a phone, a DSLR camera, or the like capable of taking pictures and video. Top frame member 132 is pivotable so that it can be angled at about 90 degrees about the rear hinged connection with respect to bottom frame member 131 so that when top frame member 132 is in this position, camera 137 is aimed along a direction X shown in FIG. 7 at the user sitting in front of system 100 and through transparent substrate 136. A hood 140 can be attached to top frame member 132 and middle frame member 133 to block light above transparent substrate 136 and camera 137. Other hoods or backdrops can also be provided that pull out to block light to camera 137.

In this way, once case 110 is opened, lift 120 can be actuated to raise camera system 130 to a height above its initial secured location, if such movement is deemed necessary. Camera system 130 can then be opened so that top frame member 132 is angled at about 90 degrees to bottom frame member 131, and middle frame member 133 can be angled at about 45 degrees to bottom frame member 131. Lift 120 permits raising and lowering camera system 130 so that camera 137 can be aligned more closely with the natural sightline of the viewer.

Figure 12:
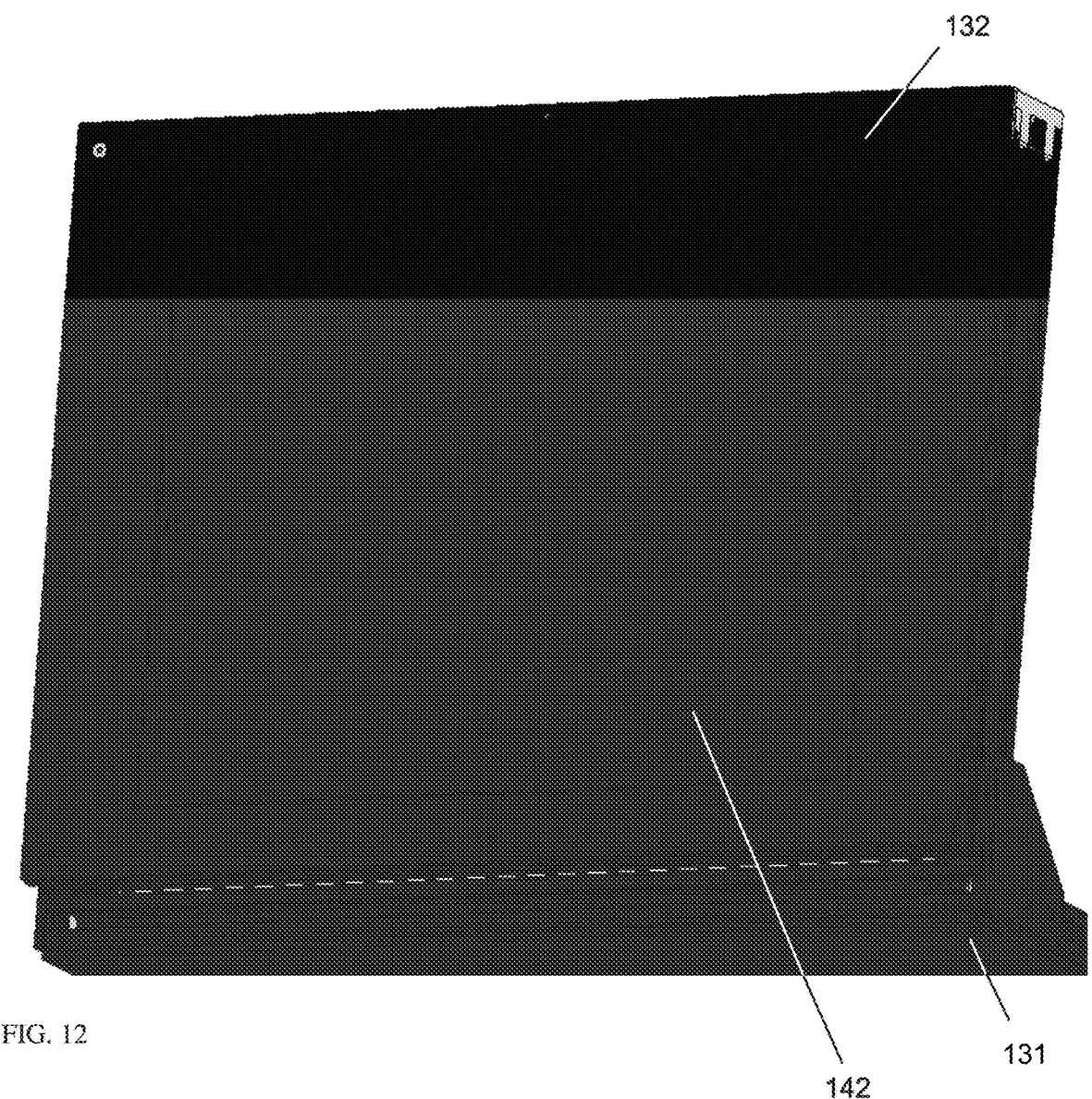
FIGS. 12 and 13 are rear perspective views of the collapsible camera system of FIG. 7.
Figure 13:
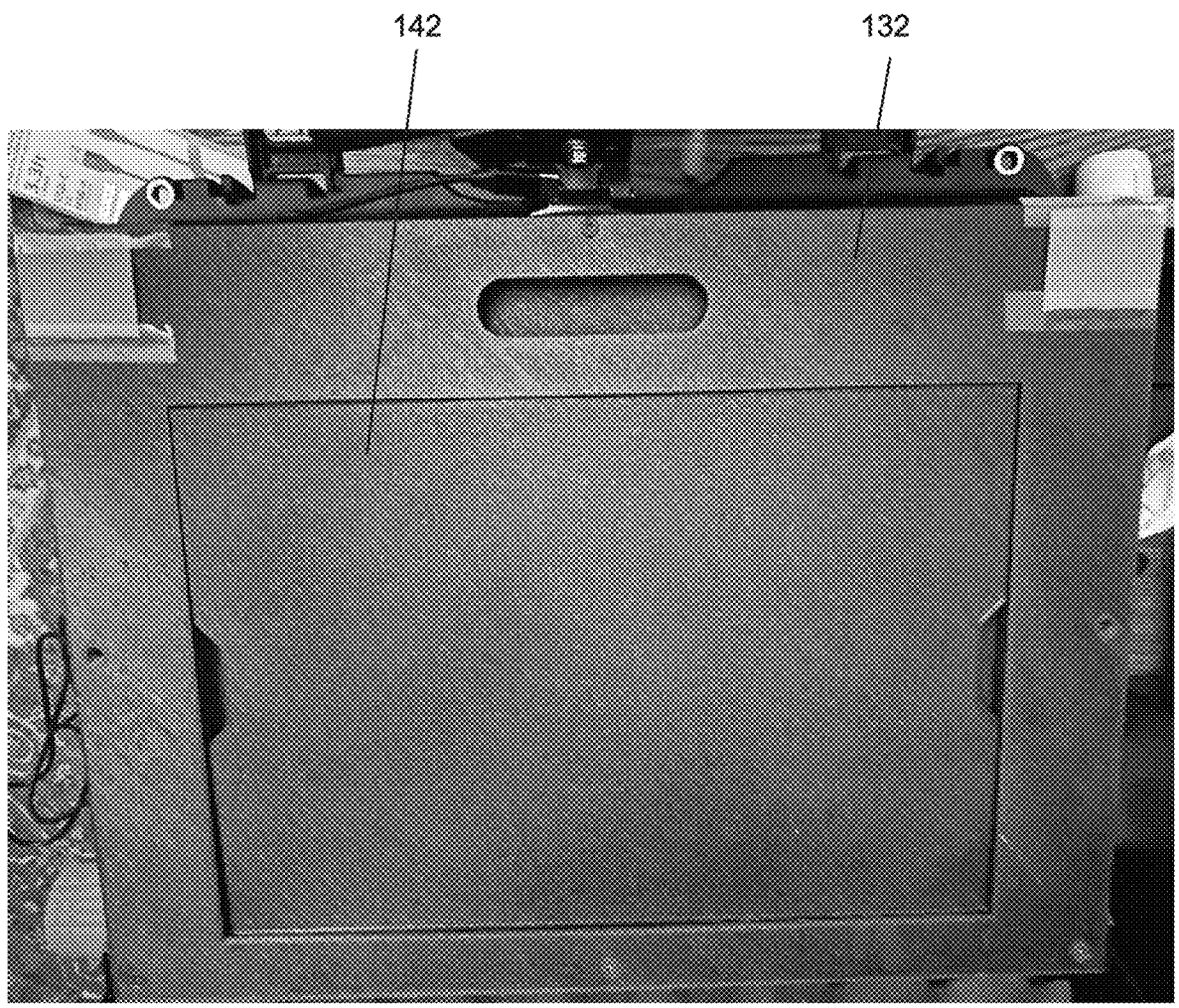
Figure 14:
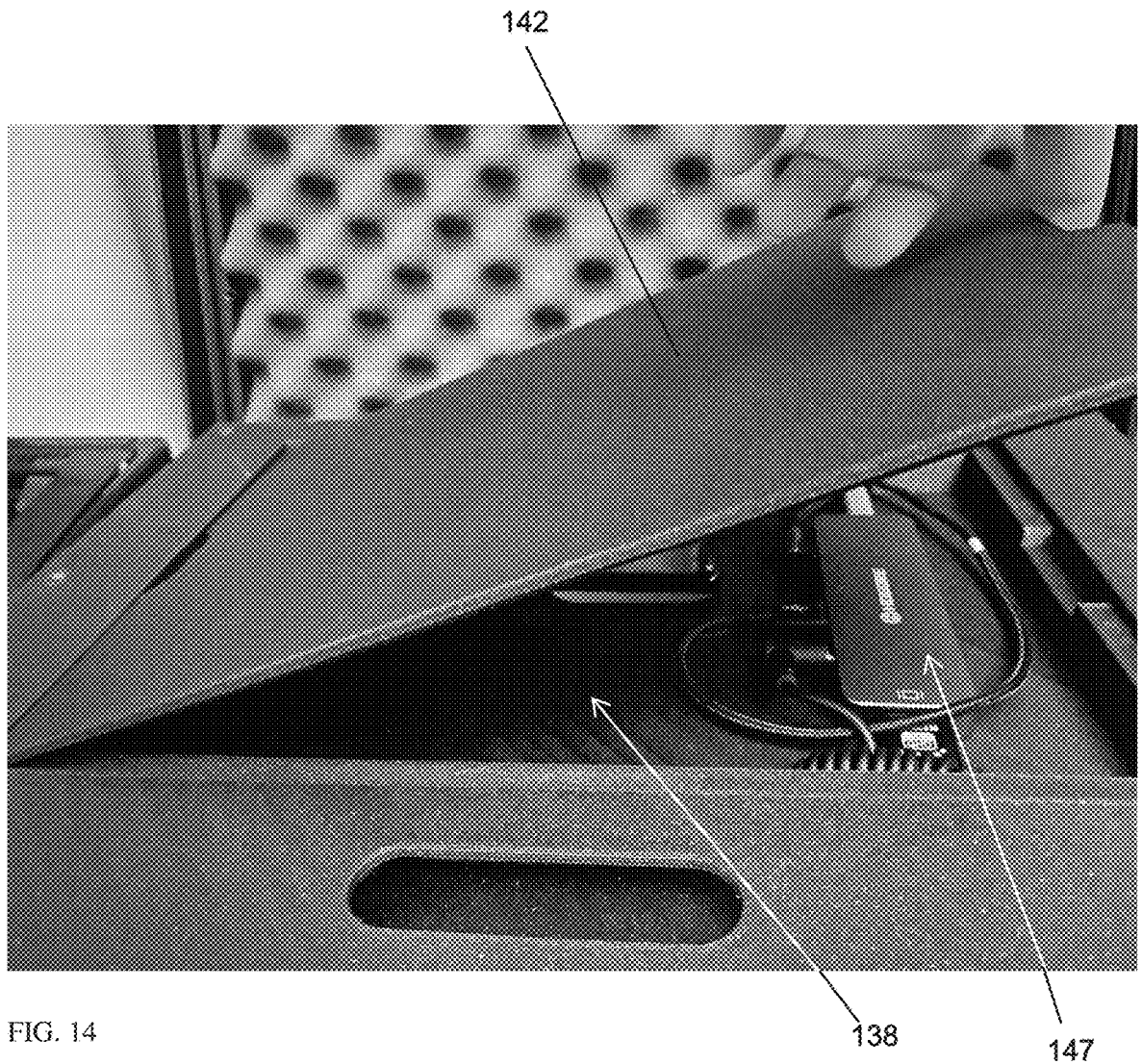
FIGS. 14 and 15 are rear perspective views of the top frame member of the collapsible camera system of FIG. 7 with a lid on and off, respectively.
Figure 15:
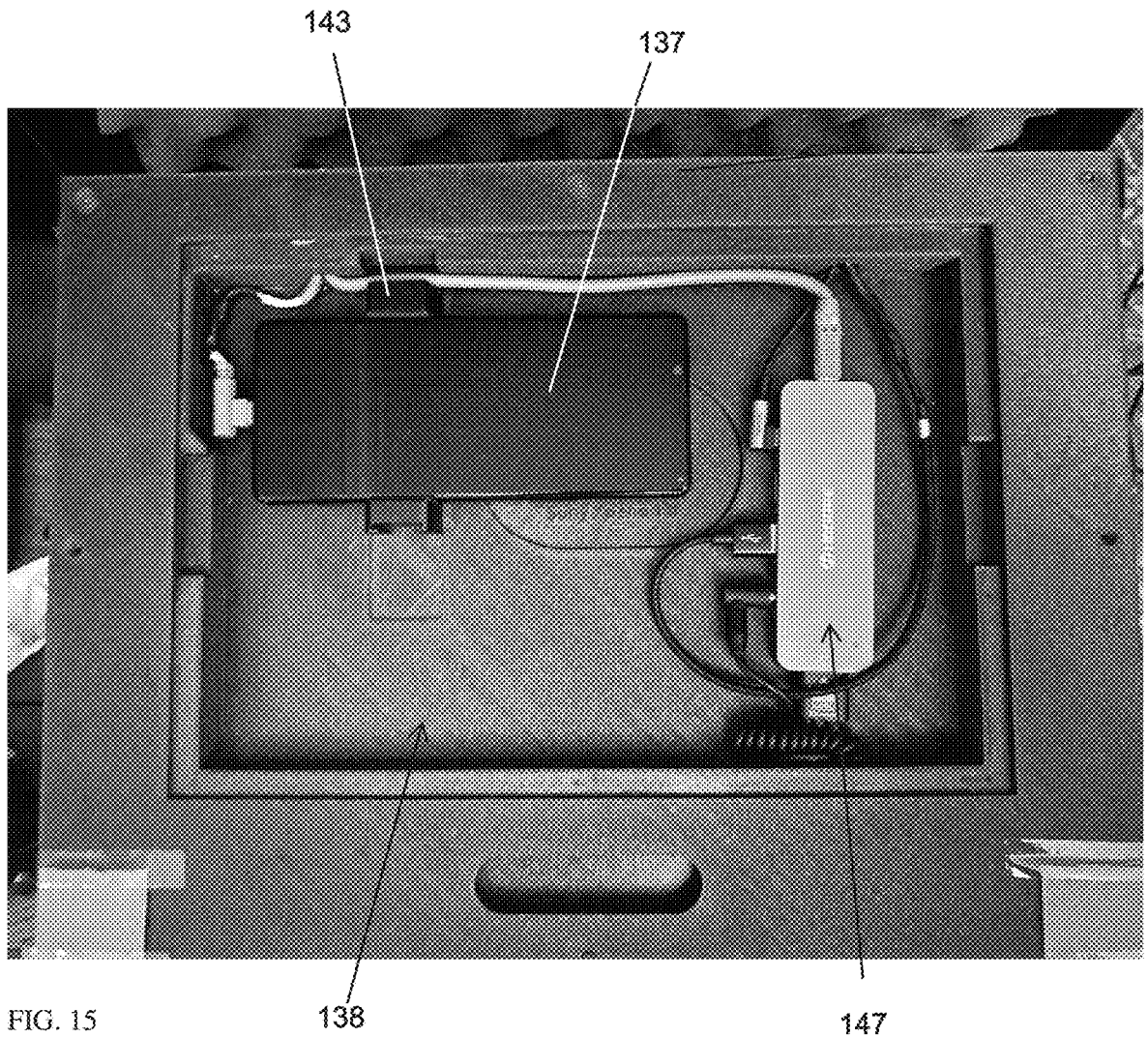
Figure 16:
FIG. 16 is a perspective view of a camera positioned near an aperture and a lens adaptor of the collapsible camera system of FIG. 7.

A portion of top frame member 132 being a panel 141 and enclosure 138 is shown in FIGS. 8-15 to illustrate how camera 137 is positioned. Additional images of top frame member 132 are provided in FIGS. 12-14 showing a removable lid 142 from a side of top frame member 132 that faces away from the user when camera system 130 is in use. Panel 142 can be opened to expose the interior of enclosure 138, as shown in FIGS. 14 and 15. Camera 137 can be positioned within enclosure 138, and particularly within a clamp 143 to securely position camera 137 so that its lens(es) is disposed within an aperture 144 of enclosure 138 to be aimed at the user through transparent substrate 136. Clamp 143 can be anchored by a screw or nut and bolt configuration 145, which allows at least a portion of clamp 143 to slide and therefore be adjustable within enclosure 138. Nut and bolt 145 are disposed within a slot 146 and can be secured in one of many positions. This facilitates the use of many different kinds of cameras, including smart phones and DSLR cameras that may not be similarly dimensioned but nonetheless fit within enclosure 138 for use in camera system 130. In some instances, cameras may be used that are larger than the space within enclosure 138, such as certain smart phones, DSLR cameras, and even larger cinema cameras. Such cameras can be positioned to film through aperture 144 even if they are not secured within or to enclosure 138. In such case, for example, a larger cinema camera can be shipped with system 100 but separately set up behind top frame member 132 to film through aperture 144. This provides a system 100 that still includes all components for video production while maintaining minimal setup. The camera could also be packaged and shipped separate from the remainder of system 100 or could be available at the remote location already.

Figure 17:
FIGS. 17-19 are perspective views of the lens adaptor of FIG. 16 in connection with the top frame member of the collapsible camera system of FIG. 7.
Figure 18:
Figure 19:
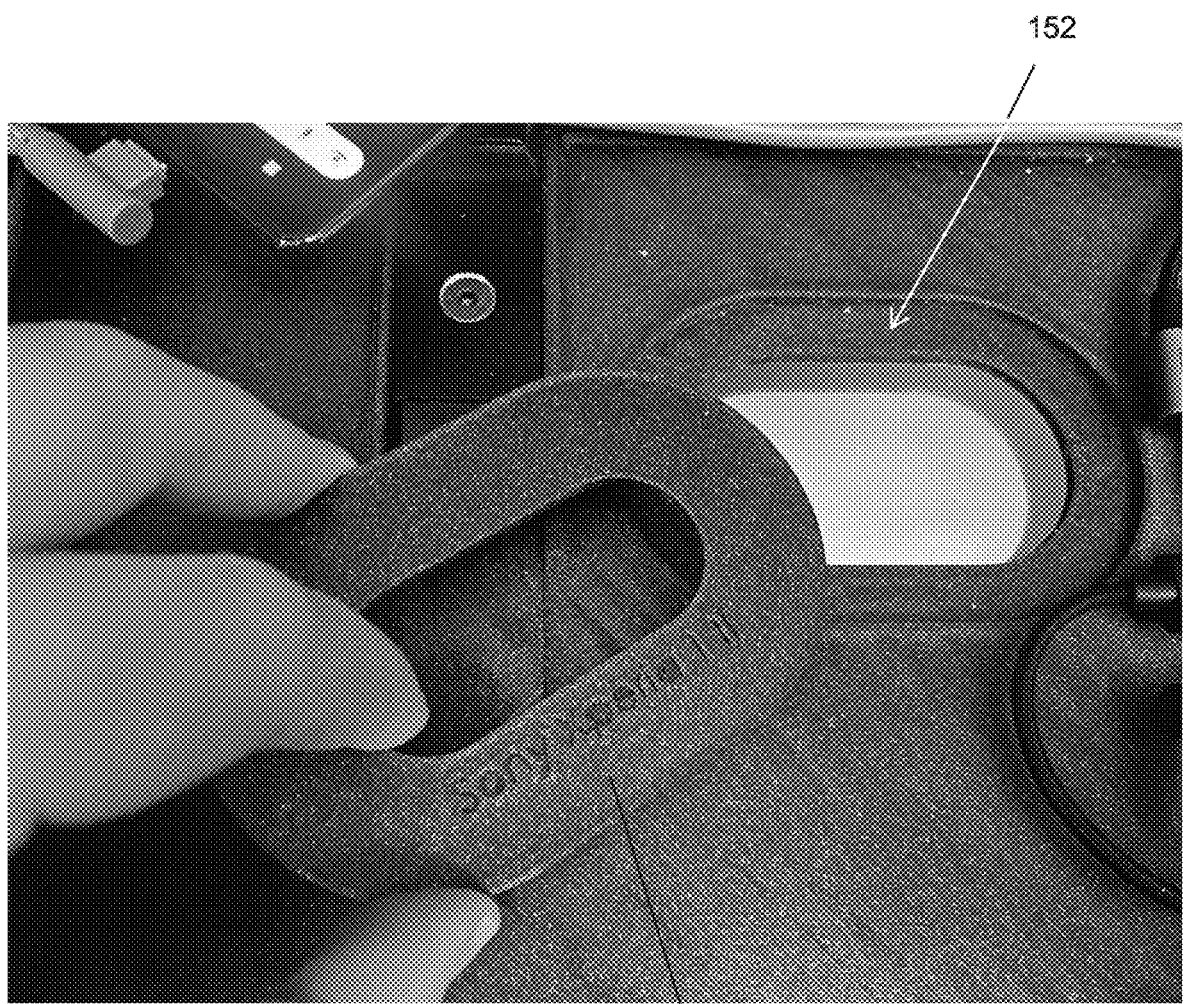

One important feature that further facilitates the use of various camera devices is lens adaptor 150, shown in FIGS. 17-19. Aperture 144 is purposely designed to be large so as to accommodate many types of cameras. However, in order to provide the correct size and geometry of an aperture for a particular camera, lens adaptor 150 is designed for a specific type of camera. For example, lens adaptor 150 shown in FIGS. 17-19 is for a particular type of smart phone having an oval or obround shaped camera lens. Lens adaptor 150 closely fits around the camera lens to properly frame the lens to optimize light intake for the camera. A goal of the lens adaptor 150 is to reduce light pollution to the lens of the camera. For example, light can reach the lens from around or even behind the camera, even with removable lid 142 in position over camera. Lens adaptor 150 provides a tighter fit around the particular camera lens so that light pollution is reduced or eliminated from these sources. In addition, when cameras are used such as cinema cameras in a use where removable lid 142 is removed during filming, lens adaptor 150 can be even more important to block out light from the room coming from behind the lens. Thus, when the camera sticks out the back of top frame member 132, a lens adaptor 150 specifically designed for a particular camera and/or lens can optimize the lighting conditions regardless of the camera or that it does not fit within enclosure 138. This more easily facilitates use of a high-end production style camera with system 100. Lens adaptor 150 is manufactured to the specifics of a particular camera, and so can be labeled with the name of the particular device with which it is associated. Lens adaptor 150 can be manufactured from plastic and 3D printed to the specifications needed. Connection between top frame member 132 and lens adaptor 150 is preferably through an array of magnets 151 placed both on or within the material of top frame member 132 and on or within the material of lens adaptor 150 to allow a secure but removable fit. The outer periphery of lens adaptor 150 can match an outer periphery of a recessed profile 152 of top frame member 132 to further align the elements. Moreover, this peripheral matching allowed various configurations of lens adaptors designed with internal apertures for different cameras to all have the same periphery so that they can be magnetically secured and disposed within the same recess of top frame member 132.

In one embodiment, a plurality of lens adaptors is provided. Each adaptor has an outer periphery of a common, identical size and shape so that each adaptor is configured to mate within a recess of top frame member 132 in the same manner. Each adaptor has magnets attached or embedded at the same positions so that each adaptor can attach to top frame member 132 via magnets attached or embedded to top frame member 132 in substantially mirroring positions. Each adaptor has an inter periphery defining an aperture, with the inner periphery and aperture of each adaptor being different from every other adaptor in size and/or shape. One or more of the adaptors can be 3D printed. One or more of the adaptors can be labeled, for example in the material of the adaptor. The adaptors can be made of metal, plastic, or ceramic materials.

An important benefit to this construction is that camera system 130 can be opened and operated in a secure manner with very minimal setup. Case 110 can be located on a flat, sturdy surface and the contents therein do not have to be removed and set up outside of case 110. Moreover, when use of camera system 130 is finished, it can simply be folded closed and secured back into case 110 with a very simple effort. A single power cable 139 can be plugged in to an external power source by the user and can provide power directly to camera 137 and computer 135 by prewired connections. In one embodiment, system 130 is shipped with a smartphone and/or computer turned off and plugged into power cable 139, so that plugging power cable 139 into an external power source automatically turns the smartphone and/or computer on when power flows. Accordingly, the user must only open case 110 and plug in power cord 139 to activate camera system 130. The power cord is retractable as seen at the top left side of FIG. 2 where it is retracted and at the top left side of FIG. 4 where it is pulled out. In other embodiments, a single or multiple power buttons may additionally be actuated to turn on camera 137 and computer 135. A USB adaptor or other type of cable connector hub 147 can be provided to electrically connect the devices and/or to distribute power.

Case 110 may be weighted to be relatively heavier at bottom lid 112 so that it is more securely and stably placed on a surface. Interior portions of case 110 can include foam or other padding so that the contents of case 110 are secured and protected when case 110 is closed and, particularly, when it is being transported.

Figure 4:
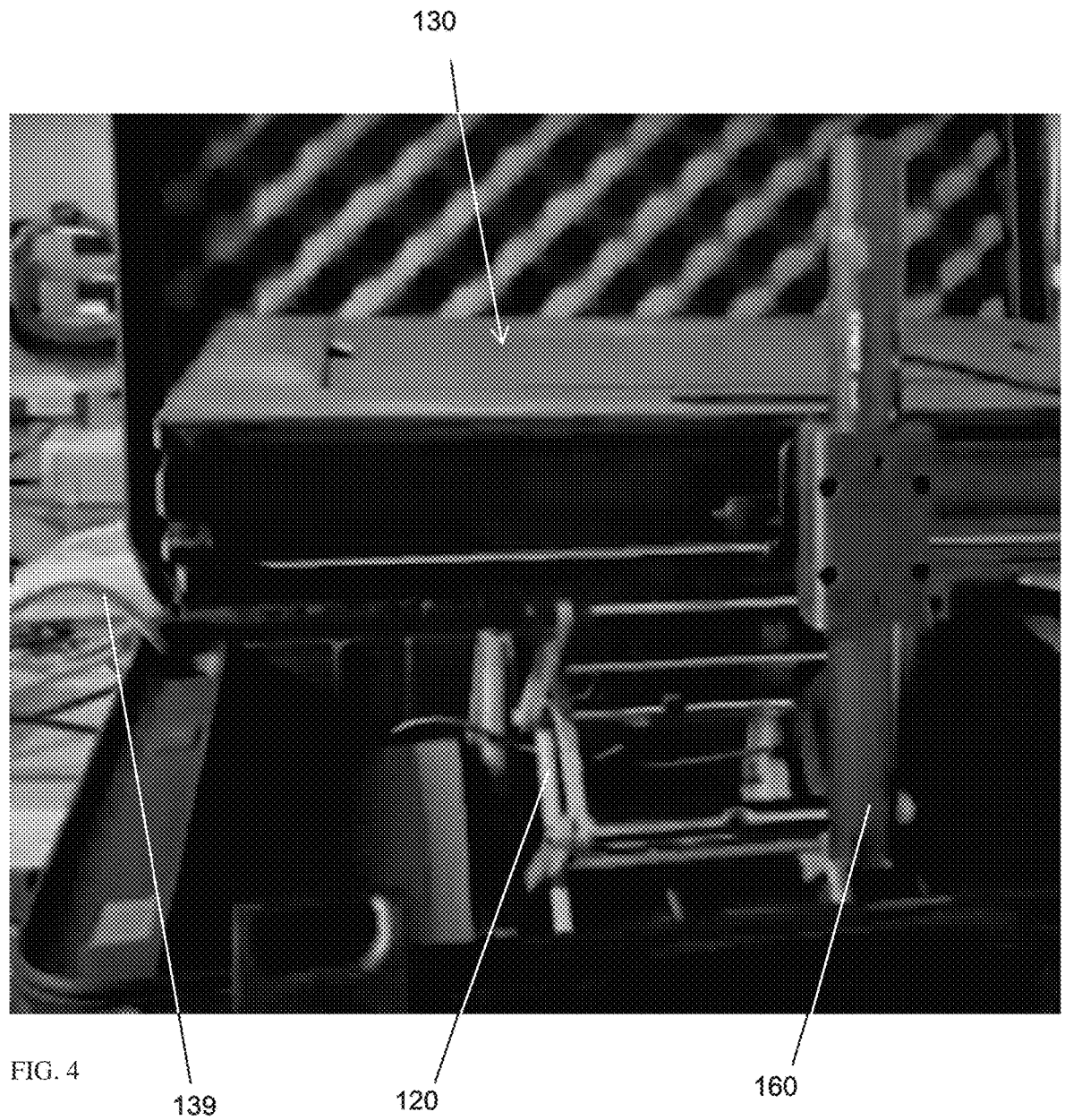
Figure 5:
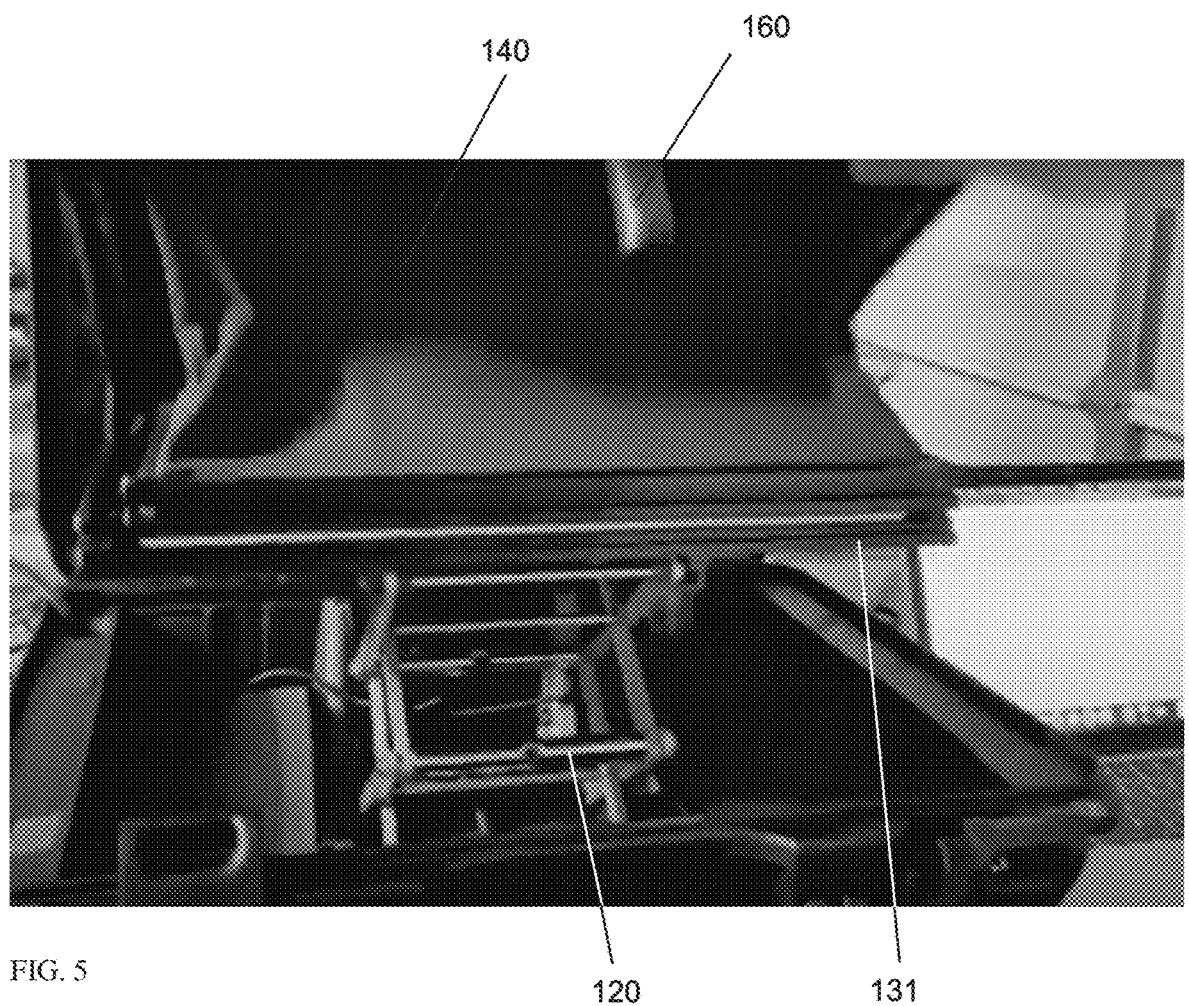
FIGS. 5 and 6 are front perspective views of the video production system of FIG. 1 with the collapsible camera system in an open configuration.
Figure 6:
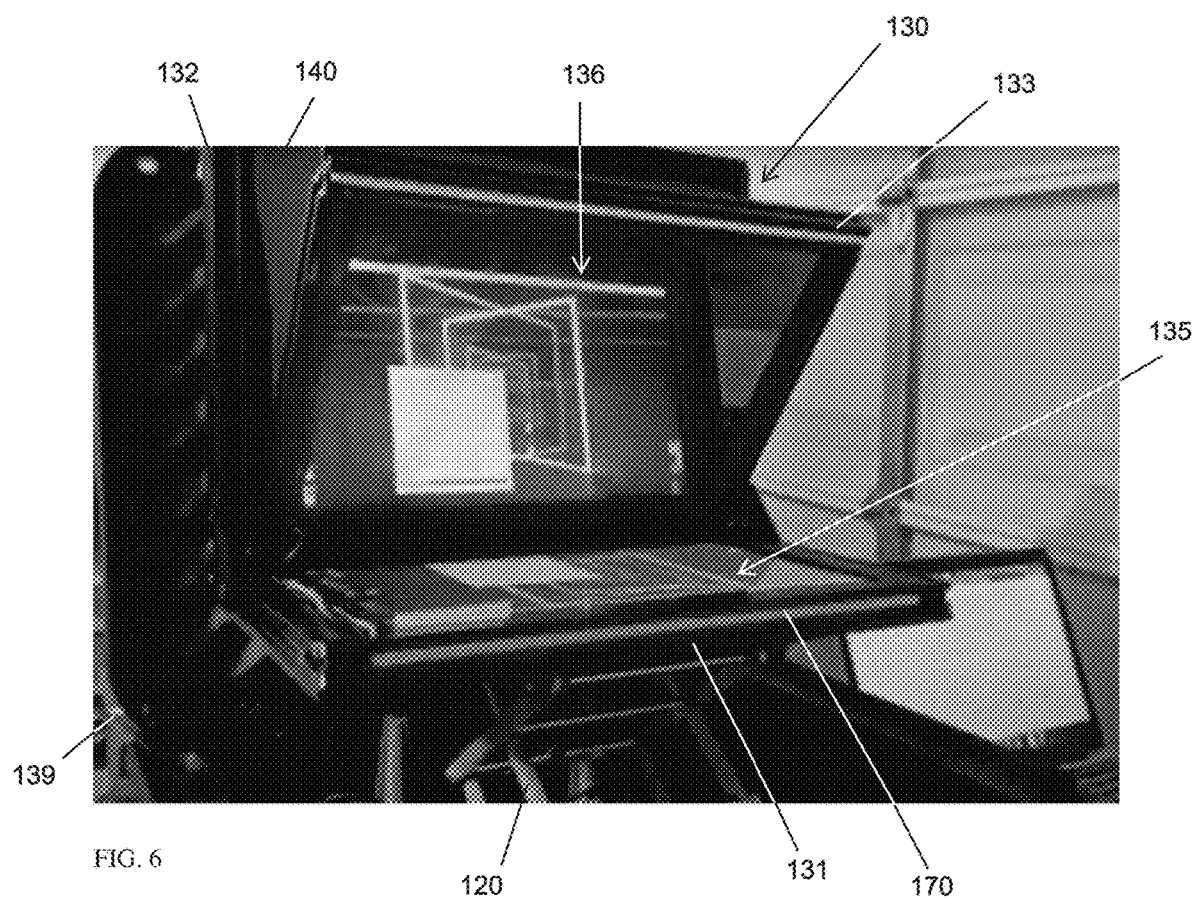
Figure 7:
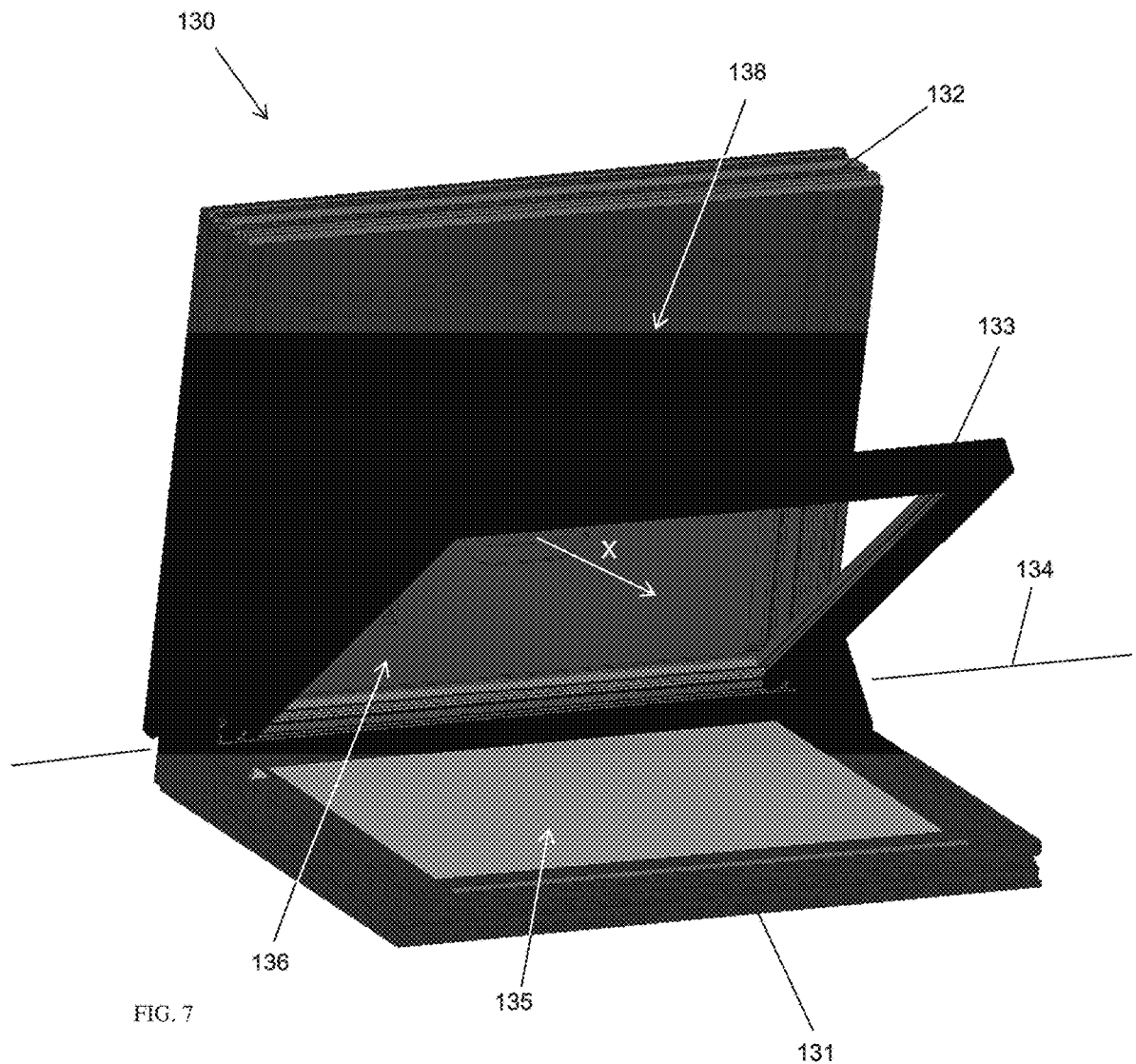
FIG. 7 is a front perspective view of the collapsible camera system of the first embodiment in an open configuration.
Figure 8:
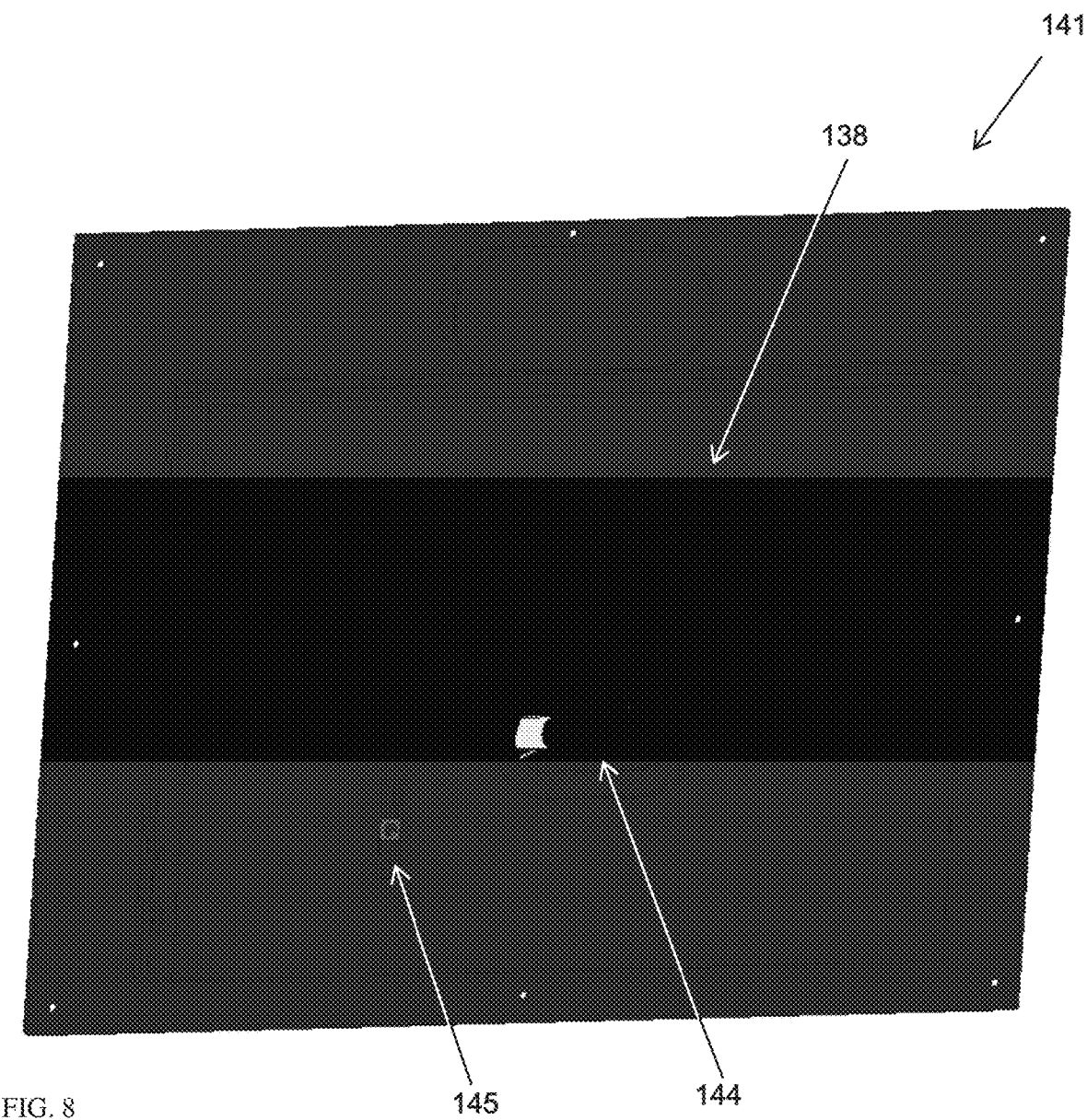
FIG. 8 is a front perspective view of a portion of a top frame member of the collapsible camera system of FIG. 7.
Figure 9:
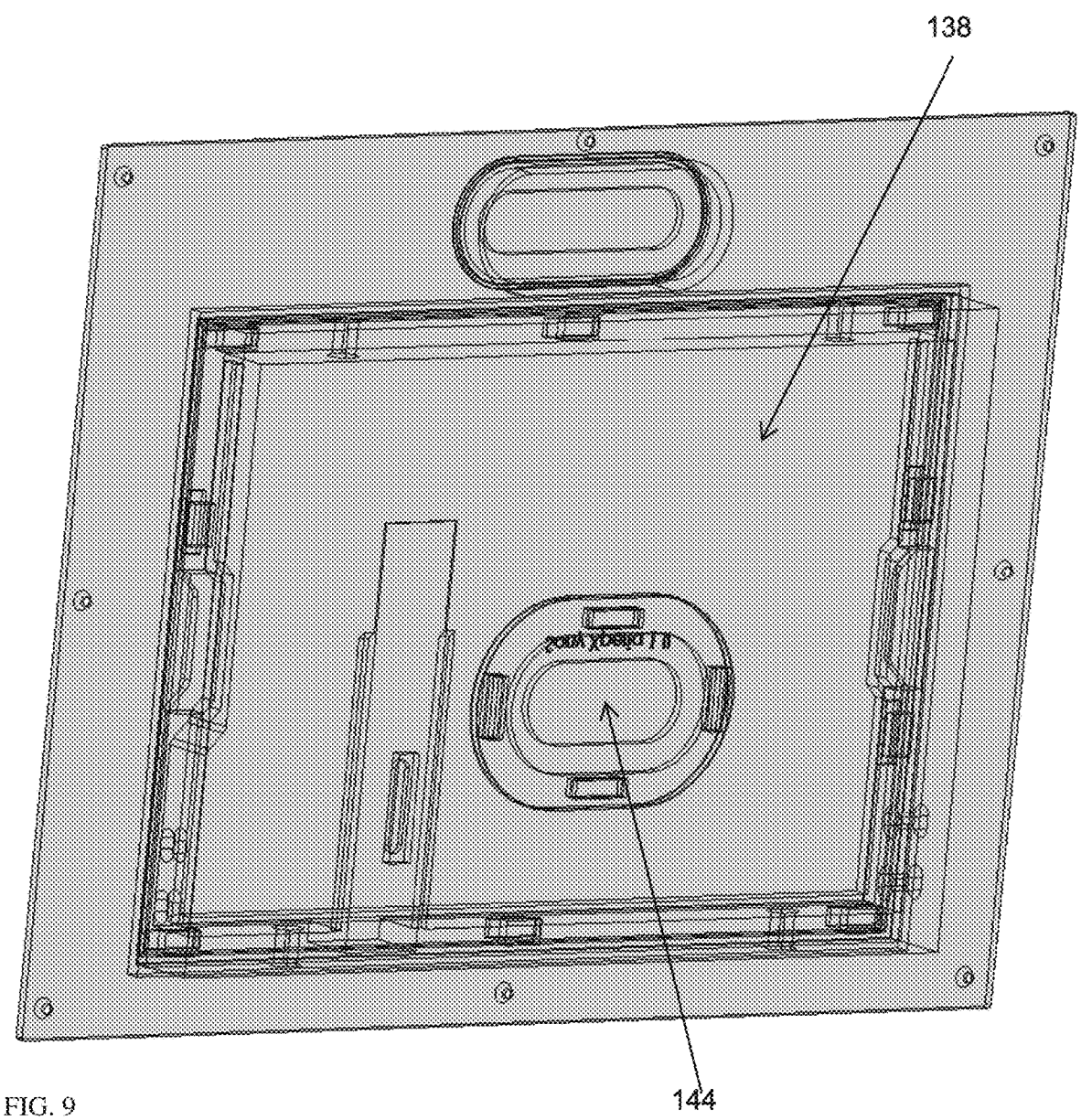
FIGS. 9 and 10 are front perspective transparent views of the portion of the top frame member of the collapsible camera system of FIG. 7, without and with a camera, respectively.
Figure 10:
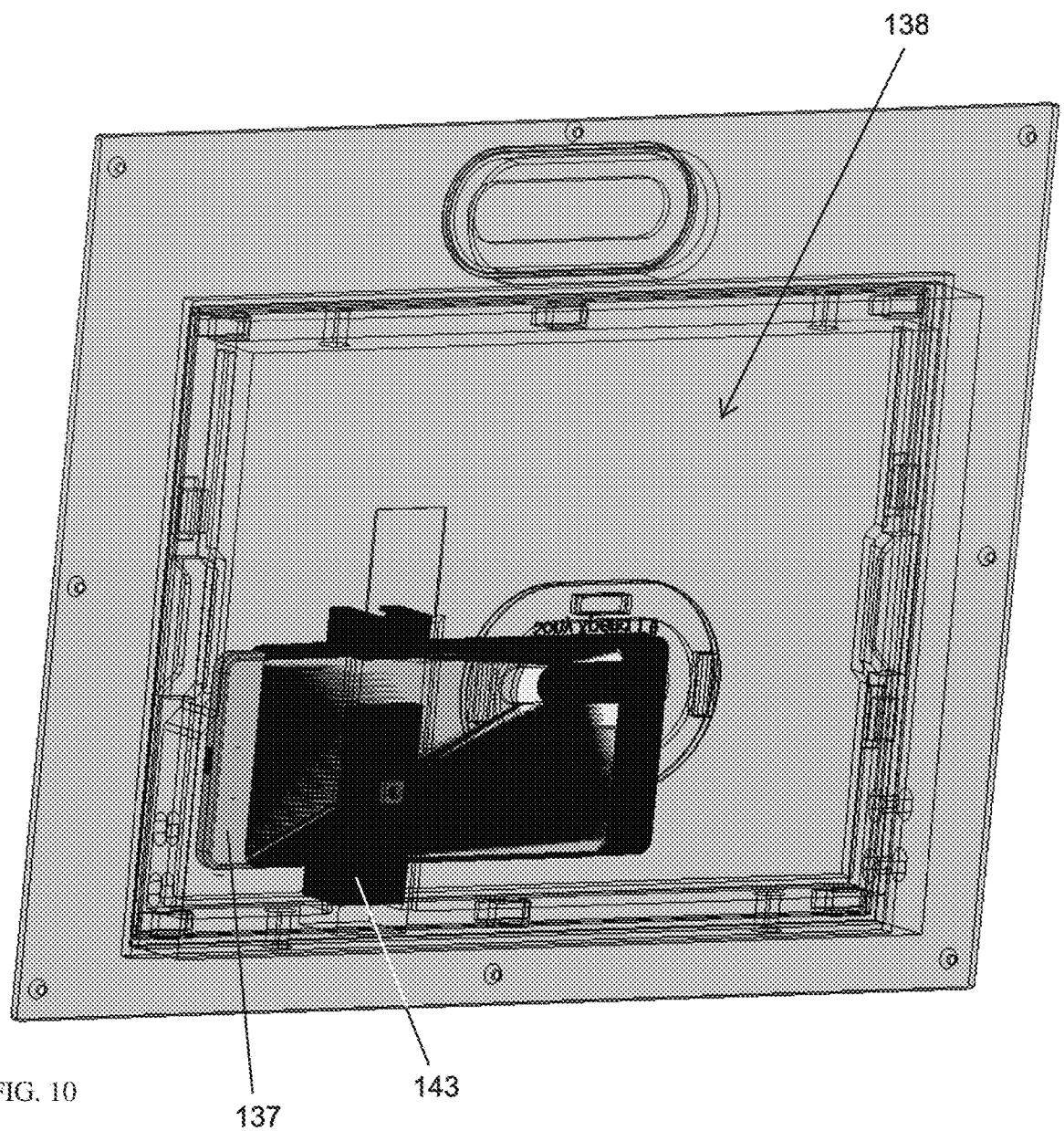
Figure 11:
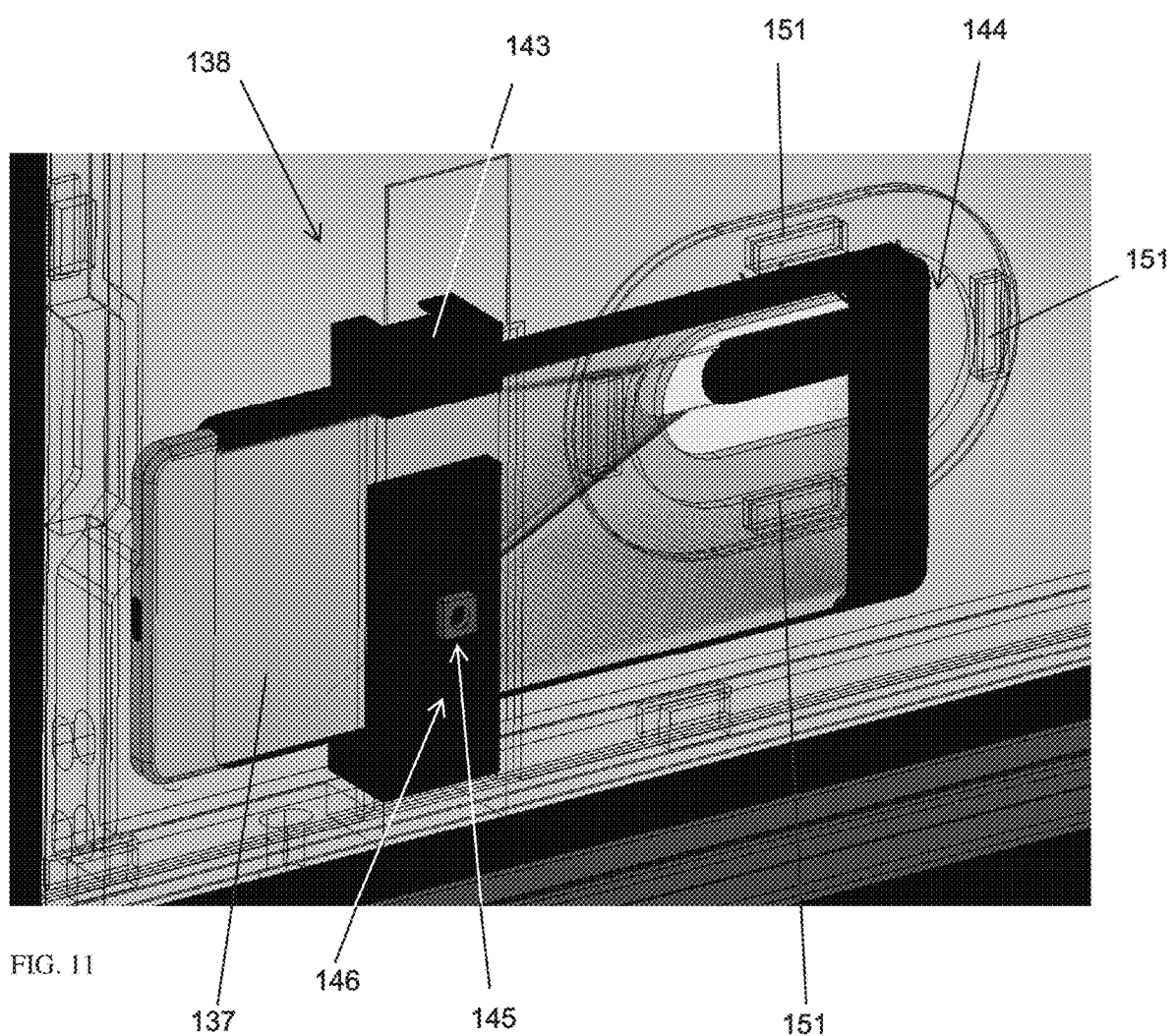
FIG. 11 is an enlarged front perspective transparent view of the view of FIG. 10.

Other external features can be provided and connected to the system to facilitate and enhance use of the camera system 130 such as a microphone 160 shown in FIGS. 4 and 5. Lighting can also be provided, such as by light bar 170 shown in FIG. 6. Other sources of lighting, such as lighting rings and additional light bars may also be provided. Both the light bar 170 and microphone 160 may be repositionable. For instance, microphone 160 may be a "shotgun" microphone that is rotatably mounted to the case 110, camera system 130, or to other portion of the system. During setup of the system 100, a user or actuator may rotate the microphone 160 to a particular position. For instance, the microphone may be rotated to direct the microphone capsule towards the user.

System 100 is particularly useful for companies that seek to obtain video or interviews from individuals at remote locations from the interviewer, or who wish to allow such individuals to keep a ready-to-use production system for on demand video or interviews. Because all of the contents of system 100 fit within case 110, including all elements of the camera and computer along with wired connections and power, an end user can receive the case through regular shipping channels such as USPS, FedEx, or UPS without requiring excessive shipping costs. System 100 is very simple to use by allowing the user to simply open up case 110 and camera system 130 and plug system 100 into an external power source. Not only does this make it very easy for the owner of the system 100 to get the system into the hands of the end user, but system 100 is also fully set up and contactless in that it essentially eliminates the need for any technical expert to be on hand to configure or set up system 100.

In this regard, the computer can be tethered, wirelessly and/or hard-wired, to the smartphone such that the computer can access the smartphone's internet connection. The smartphone may establish an internet connection via a Wi-Fi connection, LTE, 5G, or other such connection. Further, through the connection, the computer may provide power to the smartphone, access data stored on the phone, receive imagery (e.g., photos or video) captured by the camera of the smartphone, as well provide control instructions to the smartphone. In some instances, the computer may establish its own internet connection, such as through a network connection card to a local Wi-Fi system.

The system 100 can be controlled remotely. For instance, a remote operator can access and control physical aspects of system 100 such as the lift and the height to which the camera is set (by expanding or contracting the scissor lift) to set the height of the camera for an optimal recording experience. Other aspects of the system can also be controlled, such as power on and off, what is displayed on the screen of the computer, etc. In one example, the remote operator of system 100 can trigger the camera of the smartphone to begin recording. The recorded video may be transmitted back to the remote operator using the internet connection. The recorded video may be stored locally by the smartphone, stored on an external memory device within the system 100, uploaded to a cloud storage service, and/or stored remotely by the remote operator.

System 100 permits an end user to receive system 100 through the mail for easy setup and use of a remotely operated and adjustable video production system that provides a much superior video product than the use of a standard laptop or tablet, particularly one in which the video screen and camera are not aligned along the user's line of sight. Also, system 100 is extremely portable so that an end user can carry system 100 for use on demand when, for example, a reporter must communicate multiple times to a host or an interviewee must provide multiple interviews to different sources.

Figure 20:
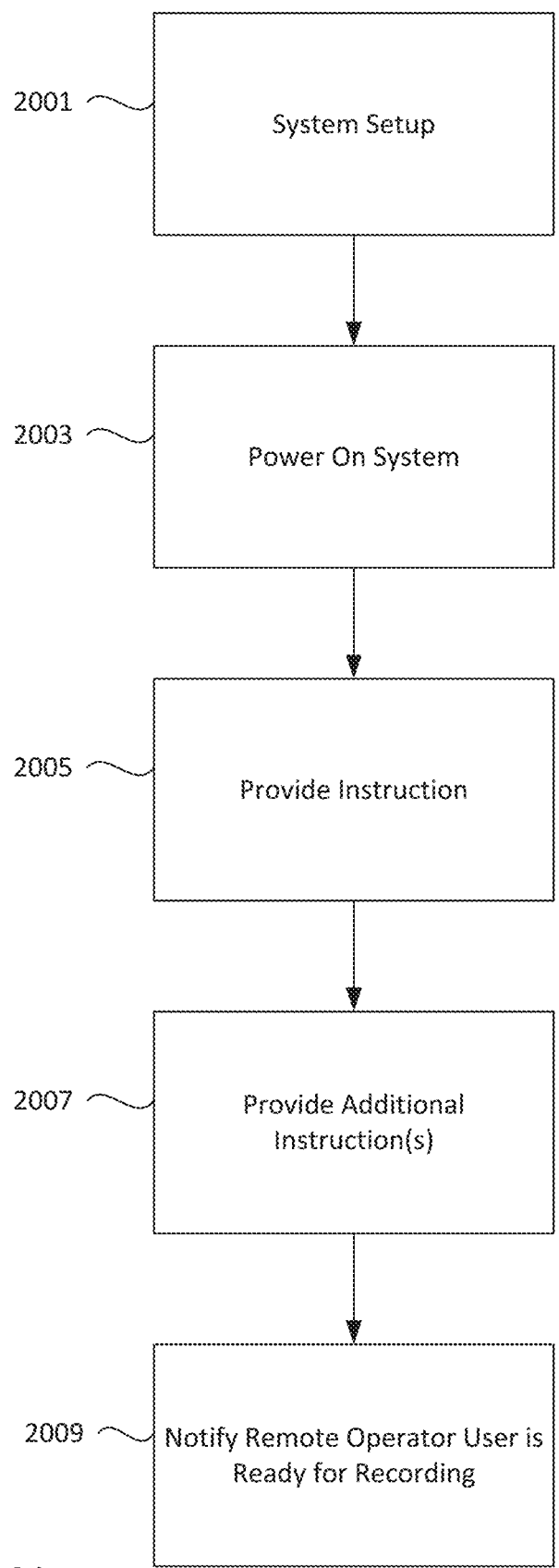
FIG. 20 illustrates a flow diagram of an operation of the video production system.

FIG. 20 illustrates a flow diagram of an operation of the system 100. In this regard, the user may set up the system as illustrated by block 2001. System set-up may include the user opening the case 110 and plugging in the power cord 139 to a power source. The user may then power on the system 100, such as by hitting a power switch, as illustrated by block 2003. Upon powering on the system, the computer 135 may boot-up and run predefined operations. In some instances, the computer 135 may provide power to the smartphone, which may cause the smartphone to turn on. Moreover, the computer may charge the battery of the smartphone. Predefined operations may include the computer establishing a connection with a remote system, such through an internet connection, and the computer establishing a connection with the smartphone.

After the system is powered on, the computer may provide instructions to the user, as illustrated by block 2005. The instructions may include tasks, such as turning the microphone to a particular direction, adjusting the light bar etc. Upon completion of the task, the user may push a button, such as 210, indicating completion of the instruction. In some instances, an additional task may be provided to the user, as illustrated by block 2007. At the completion of each additional task, the user may push button 210 to advance to the next instruction.

After completion of all instructions, the computer may notify a remote operator that the user is ready to begin recording, as illustrated by block 2009. At this time, the remote operator may trigger the camera to begin recording. In this regard, the remote operator may communicate directly with the smartphone or through the computer. Although block 2009 illustrates that the computer notifies a remote operator, the computer may instead instruct the smartphone to begin recording with or without notifying the remote operator.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A portable, collapsible video production system comprising:
   a case having a top lid connected to a bottom lid;
   a lift rigidly secured within the case to the top lid or the bottom lid; and
   a collapsible camera system rigidly secured to a top of the lift, wherein the camera system includes:
      a bottom frame member housing a computer with a screen;
      a middle frame member housing a transparent substrate that, when angled with respect to the bottom frame member, is configured to project an image of the screen to a user facing the case; and
      a top frame member housing a camera that, when angled with respect to the bottom frame member, is configured to aim the camera through the transparent substrate at a user facing the case, wherein the bottom frame, the middle frame, and the upper frame are pivotably connected to each other along a hinge axis.

2. The production system of claim 1, wherein in a working condition, the case is open and the camera is operable to record one or more images of a user through the transparent substrate while the collapsible camera system remains rigidly secured within the case.

3. The production system of claim 1, wherein in a non-working condition, the collapsible camera system is closed so that the bottom frame member, the middle frame member, and the top frame member are stacked on one another, and the case is closed.

4. The production system of claim 1, wherein in the working condition, the top frame member is angled at substantially 90 degrees with respect to bottom frame member and the middle frame member is angled at substantially 45 degrees with respect to the bottom frame member.

5. A method of using the production system of claim 1, comprising:
opening the case by moving the top lid with respect to the bottom lid;
operating the lift to raise the collapsible camera system above the bottom lid;
raising the top frame member to form an angle of substantially 90 degrees with respect to bottom frame member; and
raising the middle frame member to form an angle of substantially 45 degrees with respect to the bottom frame member.

6. The method of claim 5, further comprising:
connecting a single power cord from the production system to an external power source to provide power to the entire production system.

7. The method of claim 5, further comprising:
operating at least one feature of the system from a remote location.

8. The method of claim 7, wherein the step of operating the at least one feature includes raising the collapsible camera system by moving the lift to adjust a height of the camera with respect to the bottom lid.

9. A method of using the production system of claim 1, comprising:
lowering the middle frame member to stack the middle frame member on the bottom frame member;
lowering the top frame member to stack the top frame member on the middle frame member;
operating the lift to lower the collapsible camera system into the bottom lid; and
closing the case by moving the top lid with respect to the bottom lid.

10. The production system of claim 1, wherein the top frame member defines an enlarged aperture for use with multiple differently configured cameras, and the camera system further comprises two or more lens adaptors configured to removably and interchangeably attach to the top frame member at the enlarged aperture to optimize light intake for a particular camera.

11. The production system of claim 1, further comprising:
a single power cord for connection to an external power source for providing power to the entire production system.

* * * * *